(12) United States Patent
Quarmby

(10) Patent No.: US 6,559,257 B2
(45) Date of Patent: *May 6, 2003

(54) ADHESIVE FORMULATIONS

(75) Inventor: Ian C. Quarmby, Apex, NC (US)

(73) Assignee: Lord Corporation, Cary, NC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/330,106

(22) Filed: Jun. 10, 1999

(65) Prior Publication Data

US 2001/0051701 A1 Dec. 13, 2001

Related U.S. Application Data

(60) Provisional application No. 60/089,115, filed on Jun. 12, 1998.

(51) Int. Cl.⁷ .................. C08F 130/02; C08F 230/02; C08F 30/02
(52) U.S. Cl. .................. 526/271; 526/270; 525/109; 525/111; 525/455; 525/167; 525/169; 525/171; 156/327; 156/330; 156/332
(58) Field of Search .................. 525/167, 169, 525/171, 919, 109, 111, 455, 263, 264, 326.6, 329.7; 156/327, 330, 332; 526/270

(56) References Cited

U.S. PATENT DOCUMENTS

| | | | | |
|---|---|---|---|---|
| 3,150,118 A | * | 9/1964 | Clemens | |
| 4,223,115 A | * | 9/1980 | Zalucha et al. | 525/455 |
| 4,548,992 A | * | 10/1985 | Doi et al. | 525/167 |
| 4,607,082 A | * | 8/1986 | McGinniss | 525/286 |
| 4,638,035 A | * | 1/1987 | McGinniss | 525/384 |
| 4,857,131 A | * | 8/1989 | Damico et al. | 156/331.4 |
| 5,143,884 A | * | 9/1992 | Skoultchi et al. | 502/160 |

FOREIGN PATENT DOCUMENTS

WO  WO97/39074  * 9/1997

* cited by examiner

Primary Examiner—Tatyana Zalukaeva
(74) Attorney, Agent, or Firm—Miles B. Dearth

(57) ABSTRACT

An adhesive composition that includes a free radical-polymerizable monomer component that includes a reaction product of a (hydroxy)acrylate with an anhydride and is substantially free of at least methyl methacrylate or methacrylic acid. The adhesive composition exhibits substantially reduced objectionable odor.

11 Claims, No Drawings

ADHESIVE FORMULATIONS

This application claims benefit of U.S. Provisional Patent Application No. 60/089,115 filed Jun. 12, 1998.

FIELD OF THE INVENTION

The present invention relates to improved odor of polymerizable or curable acrylic adhesives.

BACKGROUND OF THE INVENTION

Acrylic structural adhesives are well known articles of commerce which are extensively used commercially for bonding metal and plastic materials. Acrylic structural adhesives have found growing use in the automotive industry where the adhesive bonding of metal parts is replacing welding and mechanical fastening techniques. However, these applications give rise to unique requirements not easily met by previously available adhesives. These requirements include high bond strength, improved failure mode and low odor.

Acrylic adhesives typically comprise a mixture of one or more olefinic reactive monomers such as methyl methacrylate or methacrylic acid and curing agents, with cure or polymerization being effected through a free radical polymerization mechanism. The adhesives preferably contain one or more polymeric materials which may or may not be reactive, that is, capable of being polymerized per se or at least capable of interpolymerizing with the reactive monomers, such as grafting onto or crosslinking the growing polymers from the reactive monomer polymerization. In addition, the adhesives can contain other additives for improving adhesion to substrate materials, environmental resistance, impact strength, flexibility, heat resistance, and the like.

P.C.T. Publication WO 97/39074 discloses the use of at least one polymeric material which can act as a toughening agent in an acrylic adhesive such as polychloroprene, polymer-in-monomer syrup, chlorosulphonated polyethylene rubber, copolymers of butadiene and at least one monomer copolymerizable therewith, for example, styrene, acrylonitrile, methacrylonitrile (e.g. poly(butadiene-(meth) acrylonitrile or poly(butadiene-(meth)acrylonitrile-styrene) and mixtures thereof; as well as modified elastomeric polymeric materials, such as butadiene homopolymers and copolymers as noted above modified by copolymerization therewith of trace amounts of up to about 5 percent by weight of the elastomeric material of at least one functional monomer (such as acrylic acid, methacrylic acid, maleic anhydride, fumaric acid, styrene, and methyl methacrylate to give, for example, methacrylate-terminated polybutadiene homopolymers and/or copolymers).

U.S. Pat. No. 4,769,419 ("the '419 patent"), incorporated herein by reference, discloses structural adhesive compositions for metal—metal bonding applications. The adhesives include as tougheners olefinic terminated liquid rubbers which are reacted with monoisocyanate compounds. These tougheners represented by formula I as shown in column 4 and claim 1 of the '419 patent are referred to herein as "urethane modified olefinic-terminated liquid elastomer produced from a carboxylic acid-terminated alkadiene" or, alternatively, as "isocyanate-capped methacrylate-terminated polyalkadiene produced from a carboxylic acid-terminated polyalkadiene". The '419 patent further describes acrylic adhesives with olefinic monomer, olefinic urethane reaction product of an isocyanate-functional prepolymer and a hydroxy-functional monomer, phosphorus-containing compounds, an oxidizing agent and a free radical source.

U.S. Pat. No. 5,641,834 ("the '834 patent") and U.S. Pat. No. 5,710,235, both incorporated herein by reference, disclose adhesives that include as tougheners an olefinic-terminated polyalkadiene that includes carboxy ester linking groups and at least one nascent secondary hydroxyl group that is capped with a monoisocyanate. These tougheners represented by the formulae for polymer A or polymer B in claim 1 are referred to herein as "olefinic-terminated liquid elastomer produced from a hydroxyl-terminated polyalkadiene" or, alternatively, as "isocyanate-capped methacrylate-terminated polyalkadiene produced from a hydroxyl-terminated polyalkadiene". The composition also includes a free radical-polymerizable monomer such as an olefinic monomer and, optionally, a second polymeric material. In a preferred embodiment the composition is an adhesive that also includes a phosphorus-containing compound and an ambient temperature-active redox catalyst. The '834 patent describes polymers A and B with a number average molecular weight of about 1,500 to 10,000, preferably about 1,500 to 6,000.

The odor of acrylic adhesives leaves room for improvement.

SUMMARY OF THE INVENTION

Accordingly, it is an object of the invention to provide an adhesive that has a lower or less objectionable odor. According to the invention there is provided an adhesive that includes a free radical-polymerizable monomer component that includes at least a reaction product of a (hydroxy) acrylate with an anhydride but is substantially free of methyl methacrylate or methacrylic acid.

DETAILED DESCRIPTION OF THE INVENTION

The free radical-polymerizable monomer component typically is a mixture of free radical-polymerizable monomer that at least includes a monomer that is a reaction product of a (hydroxy)acrylate with an anhydride. The presence of this reaction product allows for the removal from the adhesive formulation of at least one of methyl methacrylate, methacrylic acid or other offensive odoriferous monomers. The adhesive compositions are substantially free of at least methyl methacrylate or methacrylic acid because the use of these ingredients in amounts as little as 2 or 3 weight percent results in offensive odor emissions in certain applications. As the term "substantially free of methyl methacrylate or methacrylic acid" is used herein, it is intended to mean trace amounts or amounts less than an offensive odor generating amount which can be as little as 2 or 3 weight percent of the total formulation.

The odor of methacrylic acid can be particularly offensive. Thus, according to one embodiment of the invention the monomer component can include methylmethacrylate but is substantially free of methacrylic acid.

The (hydroxy) acrylate compound utilized to prepare the reaction product included in the monomer component of the invention can be any acrylate compound characterized by the presence of a hydroxy group. Examples of suitable hydroxy-functional acrylate compounds include 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, 3-hydroxypropyl acrylate, 4-hydroxybutyl acrylate, 3-hydroxypentyl acrylate, 6-hydroxynonyl acrylate, 3-hydroxypropyl methacrylate, 2-hydroxypentyl methacrylate, 5-hydroxypentyl methacrylate, 7-hydroxyheptyl methacrylate, 5-hydroxydecyl methacrylate, N-hydroxymethyl acrylamide, N-hydroxymethyl methacrylamide, diethylene glycol monoacrylate, diethylene glycol monomethacrylate, glycerin dimethacrylate, tri-methylol propane dimethacrylate, alkoxylated hydroxyethyl acrylate, trimethylolpropane diacrylate, alkoxylated trimethylolpropane diacrylate, reaction products of polyether glycols of acrylic or methacrylic acid and the like.

Other hydroxy-functional acrylate compounds are lactone-modified acrylate or methacrylate acid esters (hereinafter "lactone-acrylate adducts") prepared by reacting an appropriate lactone with a hydroxy-functional acrylate compound defined in the preceding paragraph as is known in the art. Lactones employed in the preparation of the lactone-acrylate adducts may be the same as the lactones defined above with respect to the preparation of the lactone-based polyester polyols. An example of a lactone-acrylate adduct is a 2-hydroxyethyl acrylate-caprolactone adduct such as TONE M-100 supplied by Union Carbide Corporation.

The anhydride that is reacted with the (hydroxy)acrylate compound can be maleic anhydride, succinic anhydride, phthalic anhydride, alkylsuccinic anhydride, alkenylsuccinic anhydride and the like. The preferred reaction product is monomethacryloyloxyethyl phthalate commercially available from International Specialty Chemicals under the trade designation BISOMER EMP.

The other free radical-polymerizable monomers that can be present in the monomer component mixture of the invention are olefinic monomers that are characterized by the presence of a —C=C— group, provided they do not give rise to objectionable odor as mentioned above. Representative olefinic monomers include esters of (meth)acrylic acid such as ethyl methacrylate, butyl methacrylate, butyl acrylate, cyclohexyl acrylate, hexyl acrylate, 2-ethylhexyl acrylate, lauryl acrylate, ethyl acrylate, diethylene glycol dimethacrylate, dicyclopentadienyloxyethyl methacrylate, cyclohexyl methacrylate, lauryl methacrylate, glycidyl methacrylate and tetrahydrofurfuryl methacrylate; acrylic acid; substituted (meth)acrylic acids such as itaconic acid, acrylonitrile, methacrylonitrile, acrylamide and methacrylamide; styrene; substituted styrenes such as vinyl styrene, chlorostyrene, methyl styrene and n-butyl styrene; vinyl acetate; vinylidene chloride; and butadienes such as 2,3-dichloro-1,3-butadiene and 2-chloro-1,3-butadiene. Other olefinic monomers include maleate esters; fumarate esters; and styrenic compounds such as styrene, chlorostyrene, methylstyrene, butylstyrene and vinyl styrene.

A mixture of the (hydroxy)acrylate/anhydride reaction product with at least one other of the above-described free radical-polymerizable monomers is preferred. A combination of tetrahydrofurfuryl methacrylate (THFMA) and monomethacryloyloxyethyl phthalate is most preferred.

The free radical-polymerizable monomer component is present in an amount of 10–90% by weight of the principal components. For purposes of weight percent only, the "principal components" are the free radical-polymerizable monomer component, an adhesion promoter, and at least one toughener or toughening agent. Any amount of the (hydroxy)acrylate/anhydride reaction product can be present, but about 0.5 to 20 weight percent, more preferably 1.5 to 10 weight percent, is preferred, based on the total weight of the adhesive part that includes the free radical-polymerizable monomer component.

The adhesive composition also can include 0–20% by weight of the principal components of an adhesion promoter. An adhesion promoter is any adhesion promoter known to those of ordinary skill in the art as useful in promoting adhesion in acrylic adhesives. Preferred adhesion promoters are phosphorus-containing compounds that enhance metal adhesion and may be any derivative of phosphinic acid, phosphonic acid or phosphoric acid having at least one P—OH group and at least one organic moiety characterized by the presence of an olefinic group, which is preferably terminally located. A listing of such phosphorus compounds is found in U.S. Pat. No. 4,223,115. A preferred phosphorus-containing compound has a structure that may be represented by the formula:

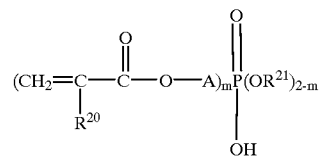

wherein $R^{20}$ is selected from the group consisting of hydrogen, an alkyl group having from one to 8, preferably one to 4, carbon atoms, and $CH_2CH$—; $R^{21}$ is selected from the group consisting of hydrogen, an alkyl group having from one to 8, preferably one to 4 carbon atoms; A is selected from the group consisting of —$R^{22}O$— and $R^{23}O)_n$, wherein $R^{22}$ is an aliphatic or cycloaliphatic alkylene group containing from one to 9, preferably 2 to 6, carbon atoms; $R^{23}$ is an alkylene group having from one to 7, preferably 2 to 4, carbon atoms; n is an integer from 2 to 10, and m is one or 2, preferably one.

Phosphorus-containing compounds having vinyl unsaturation are preferred over such compounds having allylic unsaturation, with monoesters of phosphinic, phosphonic and phosphoric acids having one unit of vinyl or allylic, especially vinyl, unsaturation presently being preferred. Representative phosphorus-containing compounds include, without limitation, phosphoric acid; 2-methacryloyloxyethyl phosphate; bis-(2-methacryloxyloxyethyl) phosphate; 2-acryloyloxyethyl phosphate; bis-(2-acryloyloxyethyl) phosphate; methyl-(2-methacryloyloxyethyl) phosphate; ethyl methacryloyloxyethyl phosphate; methyl acryloyloxyethyl phosphate; ethyl acryloyloxyethyl phosphate; compounds of the above formula wherein $R^8$ is hydrogen or methyl and $R^9$ is propyl, isobutyl, ethylhexyl, halopropyl, haloisobutyl or haloethylhexyl; vinyl phosphonic acid; cyclohexene-3-phosphonic acid; alphahydroxybutene-2 phosphonic acid; 1-hydroxy-1-phenylmethane-1,1-diphosphonic acid; 1-hydroxy-1-methyl-1-disphosphonic acid: 1-amino-1 phenyl-1,1-diphosphonic acid; 3-amino-1-hydroxypropane-1,1-disphosphonic acid; amino-tris (methylenephosphonic acid); gamma-aminopropylphosphonic acid; gamma-glycidoxypropylphosphonic acid; phosphoric acid-mono-2-aminoethyl ester; allyl phosphonic acid; allyl phosphinic acid; β-methacryloyloxyethyl phosphinic acid; diallylphosphinic acid; β-methacryloyloxyethyl) phosphinic acid and allyl methacryloyloxyethyl phosphinic acid. A most preferred adhesion promoter is 2-hydroxyethylmethacrylate phosphate.

The adhesive composition also can include about 10–80% by weight of a toughener or toughening agent, based on the principal components. The toughening agent typically is a polymeric material that provides improved impact and shatter resistance to the resultant adhesive and decreases brittleness. The polymeric material may or may not include an olefinically unsaturated structure that is capable of being polymerized per se or copolymerized with at least one of the free radical polymerizable monomers described above. The polymeric material can be for example, various solid and liquid elastomeric polymeric materials, and in particular liquid olefinic-terminated elastomers as described in U.S. Pat. Nos. 4,223,115; 4,452,944; 4,769,419; 5,641,834 and 5,710,235; and olefinic urethane reaction products of an isocyanate-functional prepolymer and a hydroxy functional monomer, as described in U.S. Pat. Nos. 4,223,115; 4,452, 944; 4,467,071 and 4,769,419, the entire disclosure of each which is hereby incorporated by reference.

Representative liquid olefinic-terminated elastomers disclosed in P.C.T. Publication WO 97/39074 include homopolymers of butadiene, copolymers of butadiene and at least one monomer copolymerizable therewith, for example, styrene, acrylonitrile, methacrylonitrile (e.g. poly(butadiene-(meth)acrylonitrile or poly(butadiene-(meth)acrylonitrile-styrene) and mixtures thereof; as well as modified elastomeric polymeric materials, such as butadiene homopolymers and copolymers as noted above modified by copolymerization therewith of trace amounts of up to about 5 percent by weight of the elastomeric material of at least one functional monomer (such as acrylic acid, methacrylic acid, maleic anhydride, fumaric acid, styrene, and methyl methacrylate to give, for example, methacrylate-terminated polybutadiene homopolymers and/or copolymers).

The present invention may also include an ambient temperature reactive catalyst system. The ambient temperature-reactive catalyst systems that may be employed in the preferred adhesive systems are well-known redox couple systems and need not be discussed herein in detail. Basically, such systems comprise at least one oxidizing agent and at least one reducing agent which are co-reactive at room temperature to generate free radicals effective to initiate addition polymerization reactions and cure the adhesive. Substantially any of the known oxidizing and reducing agents which are so co-reactive can be employed. Representative oxidizing agents include, without limitation, organic peroxides, such as benzoyl peroxide and other diacyl peroxides, hydroperoxides such as cumene hydroperoxide, peresters such as β-butylperoxybenzoate; ketone hydroperoxides such as methyl ethyl ketone hydroperoxide, organic salts of transition metals such as cobalt naphthenate, and compounds containing a labile chlorine such as sulfonyl chloride. Representative reducing agents include, without limitation, sulfinic acids; azo compounds such as azoisobutyric acid dinitrile; alpha-aminosulfones such as bis(tolysulfonmethyl)-benzyl amine; tertiary amines such as diisopropanol-p-toluidine (DIIPT), dimethyl aniline, p-halogenated aniline derivatives and dimethyl-p-toluidine; and aminealdehyde condensation products, for example, the condensation products of aliphatic aldehydes such as butyraldehyde with primary amines such as aniline or butylamine. The use of known accelerators and promoters with the redox couple catalyst systems can be advantageous. Preferably, the oxidizing agent will be present in an amount in the range from about 0.5 to about 50 percent by weight of bonding accelerator, with the amount of reducing agent being in the range from about 0.05 to about 10 preferably about 0.1 to about 6, percent by weight of polymerizable adhesive composition. DIIPT is the most preferred reducing agent. The most preferred oxidizing agent is benzoyl peroxide.

Although the adhesive of the present invention may take many forms, the most preferred adhesive systems are provided as multipack or two-part adhesive systems where one package or part contains the free radical-polymerizable monomer component and the reducing agent and a second part or package contains the oxidizing agent. The two parts are mixed together at the time of use in order to initiate the reactive cure. After mixing the individual parts, one or both surfaces to be joined are coated with the mixed adhesive system and the surfaces are placed in contact with each other.

The second package or part can include a bonding activator that includes the oxidizing agent for the redox catalyst system. The bonding activator can include:

(1) from about 0.5 to about 50 percent by weight based on total weight of bonding activator of at least one oxidizing agent which can function as an oxidant of a redox couple catalyst system; and (2) from about 30 to about 99.5 percent by weight, based on total weight of bonding accelerator, of a carrier vehicle.

The carrier vehicles which are suitable for use in the bonding activators can be a simple inert solvent or diluent such as methylene chloride, or butyl benzyl phthalate, including mixtures of such solvents or diluents. The carrier vehicle should contain no more than 5% by weight of any moiety which is reactive with the oxidizing agent at room temperature. The carrier vehicle can be a more complex mixture including at least one film-forming binder in addition to inert solvent or diluent. The carrier vehicle can contain, in addition to solvent or solvent and film-forming binder, additives such as external plasticizers, flexibilizers, suspenders and stabilizers, providing that any such additives do not unacceptably adversely affect the stability of the activator composition.

An exemplary two part system includes:

(I) a first package comprising
   (a) 10–90, preferably 20–70, weight percent of the free radical-polymerizable monomer component of the invention;
   (b) 10–80, preferably 20–50, weight percent of at least one toughener;
   (c) 0–20, preferably 2–10, weight percent of a phosphorus-containing compound having one or more olefinic groups
   (d) 0.05–10, preferably 0.1–6, weight percent of at least one reducing agent which is interactive with an oxidizing agent to produce free radicals which are capable of initiating and propagating free radical polymerization reactions; and (II) a second package comprising
   a bonding activator containing an oxidizing agent of a room temperature-active redox couple catalyst system, the oxidizing agent being reactive at room temperature with reducing agent (d) when the first and second packages are mixed to produce free radicals which are capable of initiating and propagating free radical polymerization, the amount of the oxidizing agent being sufficient to interact with agent (d),
   wherein the weight percents are based on the total amount of the principal components.

The adhesive systems of the invention may be used to bond metal surfaces, such as steel, aluminum and copper, to a variety of substrates, including metal, plastics, and other polymers, reinforced plastics, fibers, glass, ceramics, wood and the like. It is a feature of the present invention that the herein-described adhesive compositions can be employed to bond metal substrates such as steel, aluminum and copper with little, if any, pretreatment of the metal surface prior to application of the adhesive. Thus, bonding can be effected even to oily metal surfaces which are otherwise clean without an extensive pretreatment as is usually required with the vast majority of currently available primers and adhesives. Additionally, the adhesive systems of this invention provide effective bonding at room temperature, thus heat is not required either for applying the adhesive systems to the substrates or for curing.

Although the adhesives of the present invention are preferred for bonding metal surfaces, the present adhesive compositions may be applied as an adhesive, primer or coating to any surface or substrate capable of receiving the adhesive. The metals which are preferred for bonding with the present adhesives include zinc, copper, cadmium, iron, tin, aluminum, silver, chromium, alloys of such metals, and metallic coatings or platings of such metals such as galvanized steel including hot dipped, electrogalvanized steel and galvanealed steel.

The adhesive coatings may be brushed, rolled, sprayed, dotted, knifed or otherwise applied to one substrate, but preferably to both substrates to desired thickness preferably not to exceed 60 mils. The substrates may be clamped for firmness during cure in those installations where relative movement of the two substrates might be expected. For example, to adhere metal surfaces, an adherent quantity of the adhesive composition is applied to one surface, preferably to both surfaces, and the surfaces are confronted with the adhesive composition therebetween. The adhesive should have a thickness less than 60 mils for optimum results. The smoothness of the surfaces and their clearance (e.g., in the case of nuts and bolts) will determine the required film thickness for optimum bonding. The two metal surfaces and the interposed adhesive composition are maintained in engagement until the said adhesive composition has cured sufficiently to bond the said surfaces.

The following examples are provided for illustration purposes only and are not intended to limit the scope of the invention in any manner.

EXAMPLES

The following masterbatch was prepared:

| Material | Parts by Weight |
| --- | --- |
| Tetrahydrofurfurylmethacrylate (THFMA) | 16.88 |
| Monomethacryloyloxyethyl phthalate | 2.21 |
| 2-hydroxyethylmethacrylate phosphate | 3.11 |
| isocyanate-capped methacrylate-terminated butadiene oligomer produced from a hydroxyl-terminated polybutadiene as described in the '834 patent (in 20% THFMA) | 44.65 |
| Wollastonite | 8.00 |
| Silica | 4.50 |
| Titania | 2.65 |
| DIPT | 1.00 |
| Chloroanilic acid | 0.002 |
| Inhibitor (ETHANOX 330 from Albemarle Corp.) | 0.003 |
| 0.2 mm glass beads | 7.60 |
| Total | 90.6 |

EUROPRENE™ was added to the masterbatch as set forth in the table below. The EUROPRENE™ polymer, EUROPRENE™ SOL T 193A, used was a commercial product of EniChem Elastomers Americas, Inc. EUROPRENE™ SOL T 193A is a terblock polymer of styrene and isoprene with polystyrene blocks (25 parts by weight) at the ends and polyisoprene block at the center (75 parts by weight). It is a rubbery solid polymer and has a pellet form. EUROPRENE™ SOL T 193A has a reasonable solubility in THFMA. A 20 part by weight solution of EUROPRENE™ SOL T 193A in THFMA has been used for formulation convenience.

TABLE I

EUROPRENE ™ Ladder vs. T-Peel Property

| Formulation | A | B | C | D |
| --- | --- | --- | --- | --- |
| Ratio of primary toughener to auxiliary toughener EUROPRENE ™ | 100/0 | 99/1 | 97/3 | 95/5 |
| master batch | 90.60 | 90.60 | 90.60 | 90.60 |
| 20% EUROPRENE ™ | 0 | 1.88 | 5.64 | 9.40 |
| isocyanate-capped methacrylate-terminated butadiene oligomer produced from a hydroxyl-terminated polybutadiene as described in the '834 patent | 2.35 | 1.88 | 0.94 | — |
| THFMA | 7.05 | 5.64 | 2.82 | — |
| Total | 100.00 | 100.00 | 100.00 | 100.00 |

The above four formulations were prepared in 4 oz. polyethylene jars and allowed to age overnight. The formulations were loaded into two-part dispensing equipment (4:1 side A:side B mix ratio by volume). The curative (side B) used here was a benzoyl peroxide containing curing agent.

The substrate (1"×4"×0.032") tested was galvanealed steel. The coupons were bent one inch from the end to give a 90 degree angle. The coupons were treated with an aqueous lubricant (Chempet 4465 available from ADCHEM) with acid brush according to the following preparation for blank wash:

1. Add material with brush until even wetting of surface is maintained when brushing (horizontal).
2. Every five minutes, re-brush until all water has evaporated.
3. After water has evaporated, tilt coupons on about a 45 degree angle and let dry overnight (4 hour minimum).
4. Bond the upper part of the coupon away from drainage.

T-peel samples were assembled and allowed to cure at room temperature overnight, then postbaked at 325° F. for 20 min., cooled at room temperature for 60 min., postbaked again at 250° F. for 30 min. After 4 hours of cooling at room temperature, T-peel test was performed on the Instron (Model 4204) at a 2.0 in/min at room temperature. The T-peel test results are shown below:

TABLE II

EUROPRENE ™ Ladder vs. T-Peel Strength (pli)

| Formulation | Versilok ® 262 | A | B | C | D |
| --- | --- | --- | --- | --- | --- |
| Toughener ratio | — | 100/0 | 99/1 | 97/3 | 95/5 |
| Peel Strength | 35.3 | 29.2 | 35.6 | 35.0 | 32.8 |
| Std. Dev. of Peel Strength | 2.55 | 0.75 | 0.44 | 1.95 | 0.47 |
| Failure Mode | COH/TCOH | ADH | ADH | COH | COH |

Versilok® 262 is a structural adhesive commercially available from Lord Corporation that does not include two distinct tougheners of different $M_w$ or EUROPRENE. "COH" designates cohesive (substrate) failure, "TCOH" designates a thin layer of cohesive (substrate) failure and "ADH" designates adhesive failure.

What is claimed is:

1. A structural adhesive composition, exhibiting reduced odor and consisting essentially of a ambient temperature reactive redox catalyst system, a free radical-polymerizable monomer in addition to a monomer which is a reaction product of a (hydroxy)acrylate with a cyclic anhydride, said adhesive is substantially free of at least methyl methacrylate or methacrylic acid and further contains an adhesion promoter and at least one toughening agent.

2. The structural adhesive composition according to claim 1 wherein the reaction product of a (hydroxy)acrylate with a cyclic anhydride comprises monomethacryloyloxyethyl phthalate.

3. The structural adhesive composition according to claim 1 wherein the monomers are (a) tetrahydrofurfurylmethacrylate and (b) is monomethacryloyloxyethyl phthalate as the reaction product of a (hydroxy)acrylate with a cyclic anhydride.

4. A structural adhesive composition wherein the adhesive is a two-part system consisting essentially of:

(A) a first part comprising:
  (i) a free radical-polymerizable monomer in addition to a monomer which is a reaction product of a (hydroxy)acrylate with a cyclic anhydride and is substantially free of at least methyl methacrylate or methacrylic acid; and
  (ii) at least one reducing agent which is interactive with an oxidizing agent to produce free radicals which are capable of initiating and propagating free radical polymerization reactions; and (B) a second part comprising an oxidizing agent being reactive at room temperature with the reducing agent when the first and second parts are mixed to produce free radicals which are capable of initiating and propagating free radical polymerization.

5. The structural adhesive composition according to claim 4 wherein the reaction product of a (hydroxy)acrylate with a cyclic anhydride is present in amount of 0.5 to 20 weight percent, based on the total weight of the first part (A).

6. The structural adhesive composition according to claim 4 wherein the monomer component further comprises at least one other monomer in addition to the reaction product of a (hydroxy)acrylate with a cyclic anhydride.

7. The structural adhesive composition according to claim 4 wherein the reaction product of a (hydroxy)acrylate with a cyclic anhydride comprises monomethacryloyloxyethyl phthalate.

8. The structural adhesive composition according to claim 6 wherein the monomer component comprises (a) tetrahydrofurfurylmethacrylate and (b) monomethacryloyloxyethyl phthalate as the reaction product of a (hydroxy)acrylate with a cyclic anhydride.

9. A method for structurally bonding two substrates comprising providing an adhesive composition between the substrates wherein the adhesive composition comprises an ambient temperature reactive redox catalyst system a free radical-polymerizable monomer in addition to a monomer which is a reaction product of a (hydroxy)acrylate with a cyclic anhydride and is substantially free of at least methyl methacrylate or methacrylic acid and further contains an adhesion promoter and at least one toughening agent.

10. The structural adhesive composition acccording to claim 1 wherein the adhesion promoter is a derivative of phosphinic acid, phosphonic acid or phosphoric acid having at least one P—OH group and at least one organic moiety characterized by the presence of an olefinic group.

11. The structural adhesive composition according to claim 10 wherein the toughening agent is a liquid olefinic-terminated elastomer or an olefinic urethane reaction product of an isocyanate-functional prepolymer and a hydroxy functional monomer.

\* \* \* \* \*